United States Patent [19]

Sawtell

[11] Patent Number: 5,227,672
[45] Date of Patent: Jul. 13, 1993

[54] DIGITAL CLOCK SELECTION AND CHANGEOVER APPARATUS

[75] Inventor: Carl K. Sawtell, San Jose, Calif.

[73] Assignee: Astec International, Ltd., Hong Kong, Hong Kong

[21] Appl. No.: 861,250

[22] Filed: Mar. 31, 1992

[51] Int. Cl.$^5$ .................. H01J 19/82; H04Q 3/00
[52] U.S. Cl. .................. 307/269; 307/219; 328/137
[58] Field of Search ............. 307/219, 243, 355, 529, 307/269; 328/104, 120, 137, 154

[56] References Cited

U.S. PATENT DOCUMENTS

4,277,693 7/1981 Hoekman .................. 307/219
4,949,052 8/1990 Chigira .................. 307/219

Primary Examiner—Jin F. Ng
Assistant Examiner—Sinh Tran
Attorney, Agent, or Firm—McCubbrey, Bartels, Meyer & Ward

[57] ABSTRACT

A clock changeover device comprising a first input port for accepting a first external clock signal, a second input port for accepting a second external clock signal, and an output port for outputting a selected one of the clock signals. The clock changeover device also comprises a circuit for generating a control signal as a function of one of the external clock signals. The control signal has a first state and a second state, the control signal being at the second state when the second external clock signal is coupled to the second input port, the control signal being at the first state when the second external clock signal is not coupled to the second input port. The clock changeover device further comprises an output circuit responsive to the control signal for coupling the first input port to the output port when the control signal is in the first state and for coupling the second input port to the output port when the control signal is in the second state.

13 Claims, 5 Drawing Sheets

DIGITAL CLOCK SELECTION AND CHANGEOVER APPARATUS

FIELD OF THE INVENTION

This invention relates to a device for selectively outputting one of two digital clock signals, and more particularly to a device for outputting a first clock signal until a second clock signal is generated, which thereafter takes precedence as the device's output.

BACKGROUND OF THE INVENTION

In many applications, it is desirable to switch between two clock signals. An example of such an application is in the area of switch mode power supplies. Typically, a switch mode power supply requires a clock signal be coupled to a control unit for generating a pulse width modulated signal. The clock signal is typically generated internally in the power supply. However, it is also desirable for the power supply to have the ability to use an externally supplied clock signal so that the operation of a plurality of switch mode power supplies can be synchronized. Thus, there is a need to design a circuit which normally couples the internally generated clock signal to the control unit, but which can couple an externally supplied clock signal to the control unit whenever the external clock signal is coupled to the power supply.

A common prior art device for switching between two input clock signals is a simple switch, wherein each of the two input clock signals is coupled to the device through a respective switch input terminal and wherein a selected one of said clock signals is coupled to an output terminal as a function of the present state of the switch. One disadvantage of this method is that external intervention is required to control the state of the switch, e.g., the switch needs to be manually toggled by the user. Another disadvantage is that the changeover is not smooth, such that the output clock could be held at a logic "low" or logic "high" state for an excessive period of time. For some circuit users of the device's output, such an output clock signal held for an excessive period of time in one logic state could be detrimental. In some switching power supplies, for example, the holding of the clock signal in one state for too long could cause the switching transformer to saturate and short-circuit, especially during the initial power-up.

Where the switch is electronically controlled, an additional terminal is also required for receipt of an externally generated control signal. The externally generated control signal provides the timing for the switch transitions for selecting between one input clock signal and the other. One disadvantage of this prior art device is that, in some applications, it may not be possible to add an additional terminal to a system because the number of input/output (I/O) terminals in the system are limited by packaging constraints. Another disadvantage of this prior art device is that the state of the control signal needs to be synchronized with the clock signals to ensure that an appropriate clock signal is provided at the output of the device for use by a subsequent circuit. If one of the clock signals is not functioning or is not connected to its input terminal, a clock signal will not appear at the device output when the control signal is set to select the non-functioning clock signal. For some circuit applications, the absence of a clock signal can be detrimental. In some switching power supplies, for example, the absence of the clock signal could cause the switching transformer to saturate and short-circuit under certain circumstances.

The present invention is directed towards overcoming the above mentioned disadvantages and drawbacks of the prior art, i.e., the need for an additional control terminal and the requirement that the control signal and the external clock signals be synchronized. An advantage of the present invention is that it provides a clock changeover device of improved performance and reliability as compared with prior clock changeover devices.

SUMMARY OF THE INVENTION

Broadly stated, the present invention is a clock changeover device comprising a first input port for accepting a first external clock signal, a second input port for accepting a second external clock signal, and an output port for outputting a selected one of said clock signals. The clock changeover device also comprises means for generating a control signal as a function of one of said external clock signals. The control signal has a first state and a second state, the control signal being at the second state when the second external clock signal is coupled to the second input port, the control signal being at the first state when the second external clock signal is not coupled to the second input port. The clock changeover device further comprises an output means responsive to the control signal for coupling the first input port to the output port when the control signal is in the first state and for coupling the second input port to the output port when the control signal is in the second state.

Accordingly, it is an object of the present invention to select and output a clock signal from two or more input clock signals using a minimum of device terminals.

It is another object of the present invention to provide a smooth and rapid changeover from one clock signal to another clock signal.

It is yet another object of the present invention to select and output a clock signal from two or more input clock signals without the need for an additional control/selection signal which must be synchronized with one or both of the input clock signals.

It is a further object of the present invention for a power converter module to switch from its internal oscillator to an external clock generator when the external clock generator is coupled to the power module.

It is another object of the present invention to provide a synchronous external clock signal to a plurality of power converter modules connected in a daisy chain fashion.

These and other objects of the present invention will become apparent to those skilled in the art from the following detailed description of the invention and from the accompanying drawings.

DETAILED DESCRIPTION OF THE INVENTION

Figure 1:
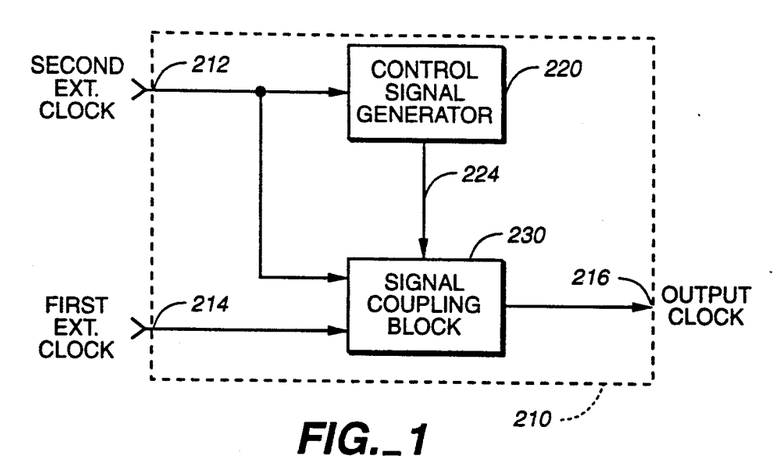
FIG. 1 is a block diagram of a clock changeover device according to the present invention.

A block diagram of a clock changeover device according to the present invention is shown at 210 in FIG. 1. Clock changeover device 210 comprises a control signal generator 220 and a signal coupling block 230. A first external clock signal is coupled to clock changeover device 210 through a first input port 214. A second external clock signal, if present, is coupled to clock changeover device 210 through a second input port 212. Control signal generator 220 generates a control signal having a first state when the second external clock signal is not coupled to clock changeover device 210 and having a second state when the second external clock signal is coupled to clock changeover device 210. This control signal is output from control signal generator 220 on line 224 and is coupled to signal coupling block 230. Signal coupling block 230 couples one of its two input clock signals to an output port 216 depending on the state of said control signal.

Clock changeover device 210 does not require any external control signal for communicating the timing for selecting one of the two external clock signals coupled to clock changeover device 210. The necessary control signal is generated internally in response to the presence of the second external clock signal at second input port 212. When the second external clock signal is not coupled to second input port 212, control signal generator 220 generates and outputs a control signal on line 224 having a first state. When the second external clock signal is coupled to second input port 212, control signal generator 220 generates and outputs a second state for said control signal. In order to ensure a smooth transition from the first external clock signal to the second external clock signal, the switching of said control signal from the first state to the second state is completed within one complete clock cycle of the second external clock signal after the second external clock signal is applied to input port 212 of clock changeover device 210.

When the control signal is in its first state, signal coupling block 230 couples the clock signal at input port 214 to output port 216. When the control signal is in its second state, signal coupling block 230 couples the clock signal at input port 212 to output port 216. It may be understood that even though FIG. 1 shows a direct coupling between the two input ports 212, 214 of clock changeover device 210 and signal coupling block 230, additional blocks to modify the clock signals can be inserted there-between. An example of such a modification is a frequency divider block. In this case, the clock signal at output port 216 is a clock signal having a frequency that is some fraction of the frequencies of one or both of the two input clock signals.

Figure 2:
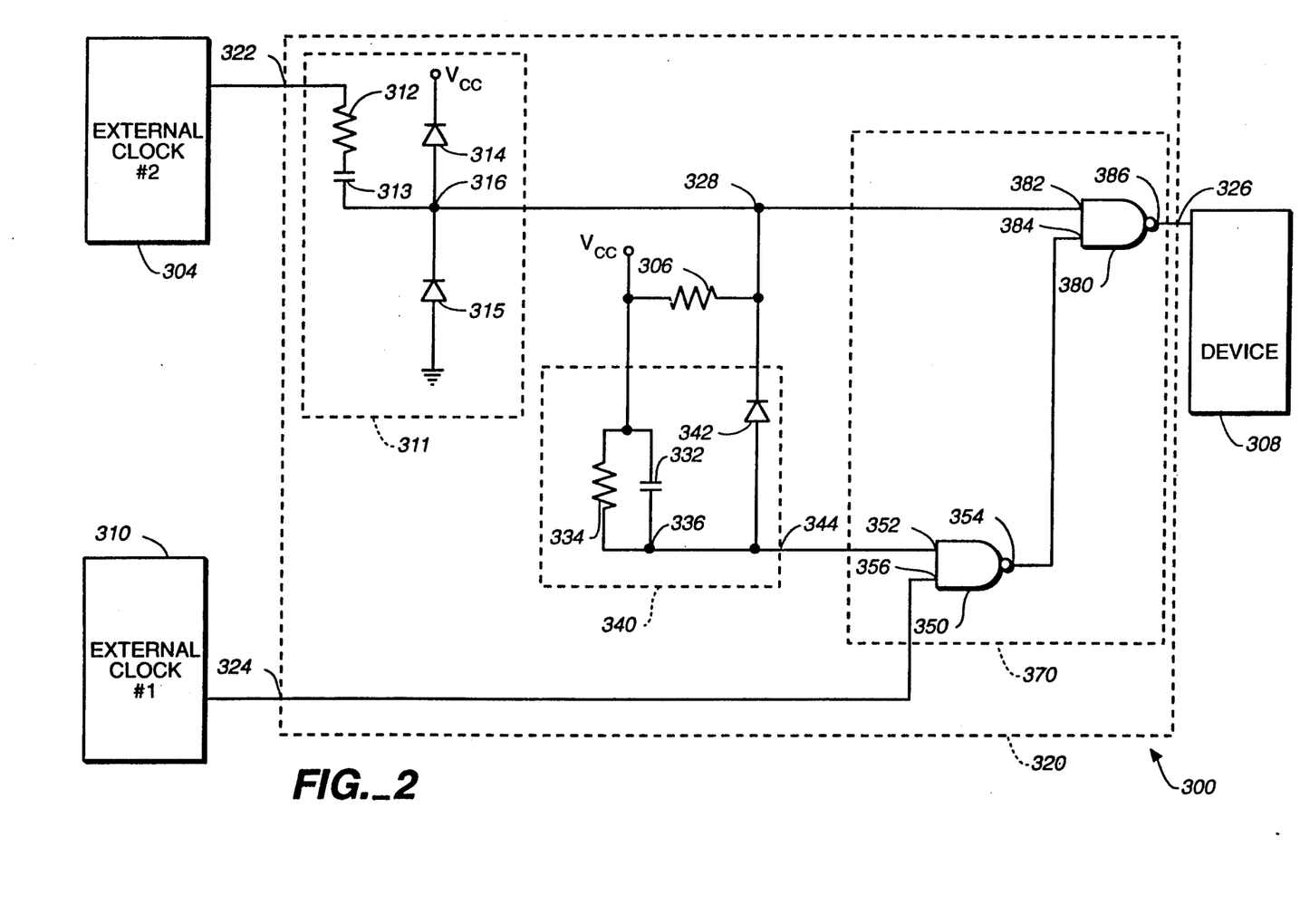
FIG. 2 is a schematic diagram of a circuit containing an embodiment of a clock changeover device according to the present invention.

A schematic diagram of a circuit 300 including an embodiment of a clock changeover device according to the present invention is shown in FIG. 2. Circuit 300 comprises a clock changeover device 320, a first external clock signal generator 310 for generating a first external clock signal, a second external clock signal generator 304 for generating a second external clock signal, and a device 308 which uses the output clock signal from clock changeover device 320.

Clock changeover device 320 comprises a first input port 324, a second input port 322, an output port 326, a control signal generator 340, and a signal coupling block 370. Input ports 322, 324 correspond to input ports 212, 214, respectively, of FIG. 1. The first and the second clock signal generated by clock signal generators 310, 304, respectively, correspond to the first and the second external clock signals, respectively, of FIG. 1.

Clock changeover device 320 further preferably includes an AC coupling network 311 connected to second input port 322. AC coupling network 311 prevents DC levels which might be present at second input port 322 from interfering with the operation of clock changeover device 320. AC coupling network 311 comprises a resistor 312, a capacitor 313 and two diodes 314 and 315. One end of resistor 312 is coupled to second input port 322 and the other end of resistor 312 is coupled to capacitor 313. The end of capacitor 313 which is not connected to resistor 312 is coupled to a node 316. The anode of diode 314 and the cathode of diode 315 are also coupled to node 316. The anode of diode 315 is coupled to ground. The cathode of diode 314 is coupled to a voltage source (not shown) having a potential of Vcc. The value of Vcc is determined by the types of digital devices used in the rest of clock changeover block 320. If TTL digital devices are used, Vcc is substantially equal to 5 volt.

Capacitor 313 allows the clock signal present at second input port 322 to travel to node 316 and blocks any DC signal present at second input port 322 from reaching node 316. Diodes 314 and 315 limit the voltage level at node 316 to within the range between zero and Vcc thereby protecting clock changeover device 320 from damage by excessive voltages. Resistor 312 limits the current flowing into and out of second input port 322 thereby protecting both the clock changeover device 320 and second external clock signal generator 304.

AC coupling network 311 distorts the clock signal present at input port 322. Signal conditioning circuits, such as a flip-flop, can be inserted between node 316 and signal coupling block 370 or between signal coupling block 370 and output port 326 in order to restore the shape of the clock signal.

Node 316 is coupled to signal coupling block 370 which comprises two NAND gates, 350 and 380. Both NAND gates 350 and 380 are digital devices powered by voltage source Vcc. The signals of these digital devices can either be in a logic "high" state, typically near Vcc, or in a logic "low" state, typically near ground potential. In FIG. 2, a TTL digital device 74132, which contains four NAND gates, is used for NAND gates 380 and 350. It is within the ordinary skill in the art that other digital devices, TTL or otherwise, can also be used to provide this functionality and be powered by one or more voltage sources.

NAND gate 380 has a first input terminal 382 coupled to a node 328, a second input terminal 384 coupled to an output terminal 354 of NAND gate 350, and an output terminal 386 coupled to output port 326 of clock changeover device 320. Node 328 is electrically the same as node 316 of AC coupling network 311. Thus, first input terminal 382 of NAND gate 380 is coupled via node 328 and AC coupling network 311 to second input port 322. NAND gate 350 has a first input terminal 352 coupled to an output port 344 of control signal generator 340 and a second input terminal 356 coupled to first input port 324 of clock changeover device 320.

The external clock signals are preferably square wave signals alternating between a period of time at a logic "high" level and a period of time at a logic "low" level. A complete clock cycle comprises a combination of a logic "high" period and a logic "low" period. The potential at the "high" level is substantially the same as Vcc. The potential at the "low" level is substantially the same as ground potential.

If a second clock signal is not generated by generator 304, and is thus not coupled to second input port 322, i.e., input port 322 is held either high, low or is an open circuit, the potential at node 328 is substantially the same as Vcc because node 328 is coupled to Vcc through a resistor 306. In this case, the state at output terminal 386 of NAND gate 380 is the complement of the state at second input terminal 384 due to the logic operation of NAND gate 380. Since second input terminal 384 of NAND gate 380 is coupled to output terminal 354 of NAND gate 350, the state at output terminal 386 of NAND gate 380 is the complement of the state at output terminal 354 of NAND gate 350.

As is discussed below, the signal at output port 344 of control signal generator 340 is also held at a "high" logic state when a second external clock signal is not coupled to second input port 322 of clock changeover device 320. In this case, first input terminal 352 of NAND gate 350 also has a logic "high" state because it is coupled to output port 344. As a result, due to the logic operation of NAND gate 350, the state at output terminal 354 of NAND gate 350 is the complement of the state at second input terminal 356. Since second input terminal 356 is coupled, via input port 324, to first clock signal generator 310, the state at output terminal 354 of NAND gate 350 is the complement of the logic state of the first external clock signal. Thus, the first external clock signal is coupled via NAND gates 350 and 380 to device 308.

As is explained below, when a second external clock signal is coupled to second input port 322 of clock changeover device 320, the signal at output port 344 of control signal generator 340 will switch to a logic "low" state. First input terminal 352 will then also switch to a logic "low" state. As a result, output terminal 354 of NAND gate 350 will change to a logic "high" state, irrespective of the state of the signal appearing at the other input to NAND gate 350. In other words, NAND gate 350 is disabled in such case, and will no longer pass the first clock signal from generator 310.

Since the output terminal 354 of NAND gate 350 is coupled to the input terminal 384 of NAND gate 380, input terminal 384 also switches to a logic "high" state. As a result, the state of output terminal 386 of NAND gate 380 is controlled by the state of the second external clock signal, and is equal to the complement thereof due to the logic operation of NAND gate 380.

The circuit configuration of control signal generator 340 is now described. Control signal generator 340 comprises a diode 342 and an RC circuit comprising a resistor 334 and a capacitor 332. The cathode of diode 342 is coupled to node 328 and the anode of diode 342 is coupled to a node 336 of RC circuit 332,334. The other end of RC circuit 332,334 is coupled to Vcc. Node 336 is coupled to output port 344. The voltage at output port 344 is a control signal for controlling the operation of signal coupling block 370. As will be explained below, capacitor 332 is an energy storage means while resistor 334 and diode 342 comprise means for changing the voltage level of capacitor 332.

The operation of control signal generator 340 when the second external clock signal is not coupled to clock changeover device 320 is now described. As was noted before, with the voltage at node 328 substantially equal to Vcc, i.e., a logic high state, diode 342 is not conducting. As a result, node 336 is at a logic "high" state because it is coupled to Vcc through resistor 334. This "high" logic state is coupled to output port 344 and thereby to input terminal 352 of NAND gate 350. NAND gate 350 is thus enabled to couple the first clock signal from generator 310 through to input terminal 384 of NAND gate 380. With node 328 in a logic high state, this causes NAND gate 380 to output the first clock signal to output port 326 and device 308.

The operation of control signal generator 340 when the second external clock signal is coupled to clock changeover device 320 is now described. As was discussed above, before the second external clock signal is coupled to second input port 322 of clock changeover device 320, the logic state at node 336 is "high". After this coupling begins, when the second external clock signal is at a logic "low" level during a first period of time, diode 342 becomes conductive because the voltage at node 336 is now higher than the voltage at node 328. This conductive path causes capacitor 332 to charge. In other words, energy is stored in capacitor 332, with the result that a potential difference is created across the plates of capacitor 332. Eventually, the voltage at node 336 decreases to a value corresponding to a logic "low" state. The value of capacitor 332 is chosen such that the voltage at node 336 drops to a "low" level before the second external clock signal completes its logic "low" level period. Capacitor 332, diode 342, and their interconnection to nodes 328 and 336 comprise means for generating a control signal having a logic "low" state when the second external clock signal is coupled to clock changeover device 320.

When the second external clock signal changes from a "low" level to a "high" level, diode 342 is again non-conductive because diode 342 is now reverse biased. Thus, the conduction path from RC circuit 332, 334 to node 328 is cut off. Capacitor 332 now begins to discharge by a current through resistor 334. As a result, the voltage at node 336 begins to rise. The time it takes to raise the voltage at node 336 to a logic "high" state from discharging by resistor 334 is designed to be longer than the time interval of the logic "high" level period of the second external clock signal. Consequently, the potential of node 336 does not reach a "high" logic level within this "high" period of the second external clock signal. As a result, NAND gate 350 remains disabled, and, as a result, continues to couple a logic high level signal to NAND gate 380. Consequently, the second external clock signal remains coupled to output port 326 of clock changeover device 320 for a sufficient length of time beyond when the second external clock signal changes back to a "low" level in the next clock period.

Finally, the operation of clock changeover device 320 when the second external clock signal is removed from input port 322 of clock changeover device 320 is discussed. Once the second external clock signal is removed, the potential at node 328 is at a "high" level because node 328 is coupled to Vcc through resistor 306. As a result, diode 342 is now nonconductive. Capacitor 332 is discharged by a current from resistor 334, such that the voltage at node 336 rises from a "low" logic level and, after some transition time, eventually to a "high" logic level. Capacitor 332, resistor 334 and their interconnection to Vcc and to node 336 comprises means for generating a control signal having a logic "high" state when the second external clock signal is decoupled from clock changeover device 320.

It should be clear to a person of ordinary skill in the art that even though capacitor 332 in control signal generator 340 is connected between Vcc and node 336, the same control signal can be generated by connecting capacitor 332 between node 336 and a fixed potential, such as ground.

Figure 3:
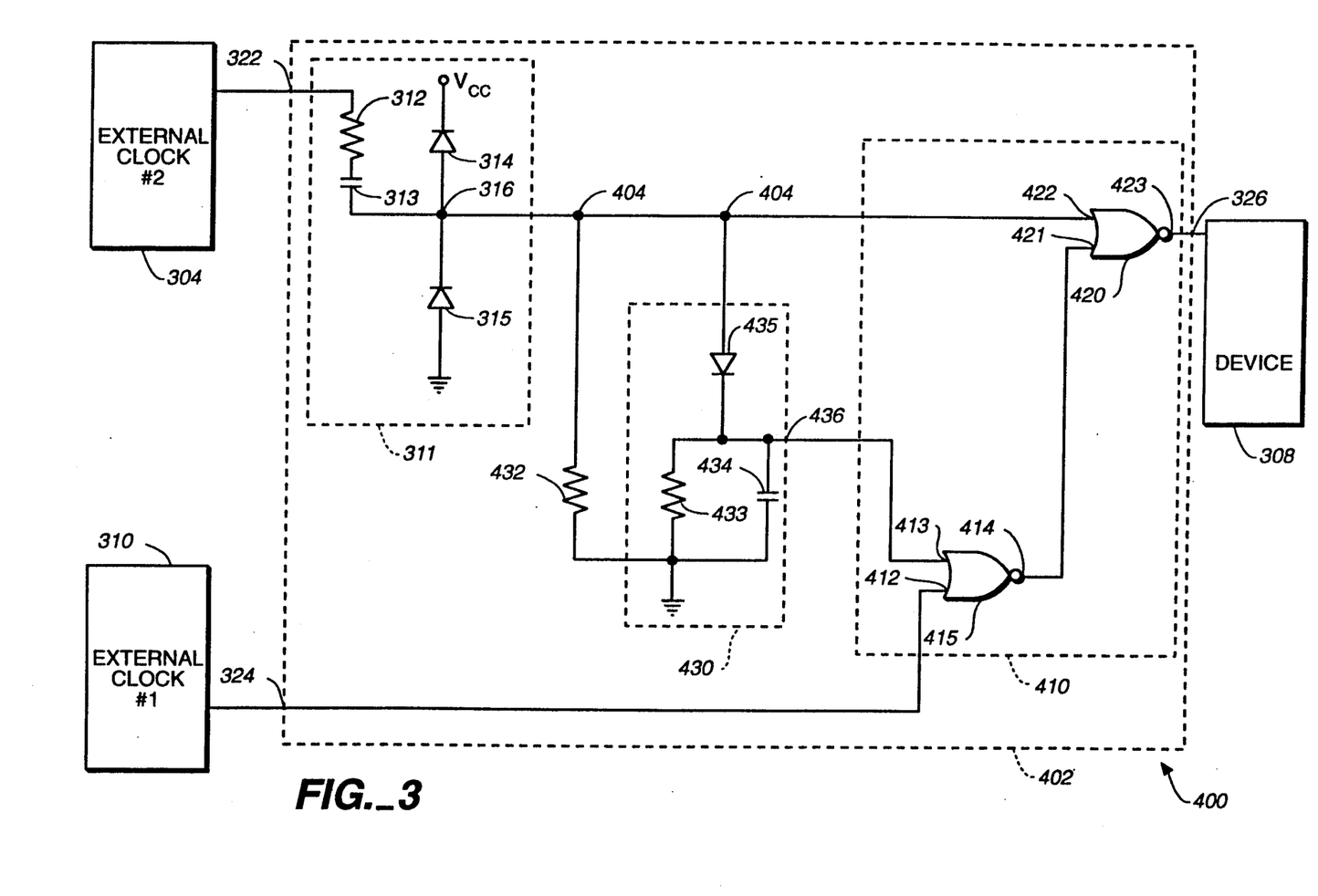
FIG. 3 is a schematic diagram of a circuit containing another embodiment of a clock changeover device according to the present invention.

It is also possible to us other types of logic gates to implement signal coupling block 370. A schematic diagram of a circuit 400 including a different embodiment of a clock changeover device 402 according to present invention is shown in FIG. 3. Circuit 400 differs from circuit 300, shown in FIG. 2, in the structure of two blocks, the signal coupling block, shown as reference numerals 370 and 410 in FIG. 2 and FIG. 3, respectively, and the control signal generator, shown as reference numerals 340 and 430 in FIG. 2 and FIG. 3, respectively. The components which are in common in FIG. 2 and FIG. 3, such as first external clock signal generator 310, second external clock signal generator 304, AC coupling network 311, device 308, and ports 322, 324, and 326, have the same reference numerals.

Signal coupling block 410 comprises two NOR gates 415 and 420. NOR gate 415 has an output terminal 414 and two input terminals 412 and 413. Output terminal 414 of NOR gate 415 is coupled to an input terminal 421 of NOR gate 420. Input terminal 412 of NOR gate 415 is coupled to clock signal generator 310 via first input port 324. Input terminal 413 of NOR gate 415 is coupled to a output node 436 of control signal generator 430. The input terminal 422 of NOR gate 420 is coupled to a node 404. The output terminal 423 of NOR gate 420 is coupled to output port 326. Node 404 is electrically the same as node 316.

If a second clock signal is not generated by generator 304 and is thus not coupled to second input port 322, i.e., input port 322 is held either high, low, or is an open circuit, the potential at node 404 is pulled down to ground by a resistor 432. Thus, the state at output terminal 423 of NOR gate 420 is the complement of the state at input terminal 421 due to the logic operation of NOR gate 420. Since input terminal 421 of NOR gate 420 is coupled to output terminal 414 of NOR gate 415, the state at output terminal 423 of NOR gate 420 is the complement of the state at output terminal 414 of NOR gate 415.

As is discussed below, the signal at output port 436 of control signal generator 430 is held at a "low" logic state when a second external clock signal is not coupled to second input port 322 of clock changeover device 402. In this case, input terminal 413 of NOR gate 415 also has a logic "low" state because it is coupled to output port 436. As a result, due to the logic operation of NOR gate 415, the state at output terminal 414 of NOR gate 415 is the complement of the state at the input terminal 412. Since input terminal 412 is coupled, via input port 324, to first clock signal generator 310, the state at output terminal 414 of NOR gate 415 is the complement of the logic state of the first external clock signal. Thus, the first clock signal is coupled, via NOR gates 415 and 420, to device 308.

As is explained below, when a second external clock signal is coupled to second input port 322 of clock changeover device 402, the signal at output port 436 of control signal generator 430 will switch to a logic "high" state. Input terminal 413 of NOR gate 415 will then also switch to a logic "high" state. As a result, output terminal 414 of NOR gate 415 will change to a logic "low" state, irrespective of the state of the signal appearing at the other input to NOR gate 415. In other words, NOR gate 415 is disabled in such case, and will no longer pass the first clock signal from generator 310.

Since the output terminal 414 of NOR gate 415 is coupled to the input terminal 421 of NOR gate 420, input terminal 414 also switches to a logic "low" state. As a result, the state at output terminal 423 of NOR gate 420 is controlled by the state of the second external clock signal, and is equal to the complement thereof, due to the logic operation of NOR gate 420.

The circuit configuration and the operation of control signal generator 430 is now described. Control signal generator 430 comprises a resistor 433, a capacitor 434, and a diode 435. The anode of diode 435 is coupled to node 404 and its cathode is coupled to output port 436 of control signal generator 430. Both resistor 433 and capacitor 434 have one end coupled to the cathode of diode 435 and the other end coupled to ground.

Node 404 is normally pulled low by resistor 432. In addition, output port 436 of control signal generator 430 is pulled low by resistor 433. However, when a high voltage is present at node 404 resulting from the presence of a clock signal, diode 435 becomes conductive and capacitor 434 is charged so that the voltage at output port 436 of control signal generator 430 is also high. When the clock signal changes to a low voltage, resistor 433 discharges capacitor 434. The values of resistor 433 and capacitor 434 are chosen such that the time it takes to discharge capacitor 434, thereby changing the voltage level of output port 436 of control signal generator 430 from a high voltage to a low voltage, is longer than the period of half a clock cycle.

It can be seen from the above description of the control signal generators 340 and 430 that the storage capacitors 332 and 434, shown in FIGS. 2 and 3, respectively, have two states. When the capacitors 332 and 434 are in the first state, it indicates that there is no clock signal present at second input port 322. When the capacitors 332 and 434 are in the second state, it indicates that a clock signal is present at second input port 322. The other circuit elements in control signal generators 340 and 430 are chosen such that when the clock signal is present, capacitors 332 and 434 change quickly, i.e., within half a clock cycle, from the first state to the second state. As the clock signal goes to the next half cycle, capacitors 332 and 434 tend to move from the second state back to the first state. In order to keep capacitors 332 and 434 at the second state, the change from the second state to the first state should take more than half a clock cycle. To this end, a circuit is needed which drives capacitors 332 and 434 from the first state to the second state with a high current, but only allows a low current path for capacitors 332 and 434 to return from the second state to the first state.

In control signal generators 320 and 402, diodes 342 and 435, respectively, provide a low impedance path when they are forward biased to change capacitors 332 and 434 from the first state to the second state. However, when diodes 342 and 435 become nonconductive, a separate low current path, through resistors 334 and 433, is used to return capacitors 332 and 434, respectively, to the first state.

Figure 4A:
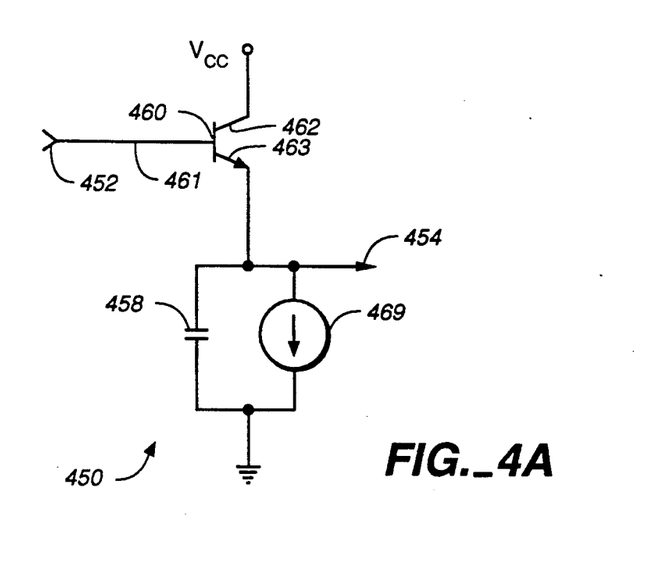
FIG. 4(a) is a schematic diagram of an embodiment of a control signal generator according to the present invention.

Instead of using a diode, other circuit elements can be used to provide the same function, i.e., allowing a large current to flow in one direction only. An example is to connect the capacitor to a transistor emitter follower circuit. The transistor is turned on or off by the clock signal. Thus, a high current is allowed to flow when the transistor is turned on and the transistor acts as an open circuit when the transistor is turned off. A circuit implementing this example is shown in FIG. 4(a). Another example is to connect the capacitor to an open collector or an open drain output of a transistor or a logic device. The state of the open collector or open drain is controlled by the clock signal. Again, a high current is allowed to flow when the transistor is turned on and the transistor acts as an open circuit when the transistor is turned off.

Instead of using a resistor to provide a low current path for either capacitor 332 or 434, so that it can slowly return from the second state to the first state, other circuit elements can also be used. An example is to connect a constant current source to the capacitor.

A further implementation of a control signal generator is to drive the storage capacitor directly using a CMOS invertor stage. The length and width of the N-channel and P-channel of the invertor have appropriate length and width so that the ratio of their ON resistances are such that the invertor can change the state of the capacitor much more quickly in one direction that the other. An embodiment of a control signal generator using CMOS technology is shown in FIG. 4(b).

Figure 4B:
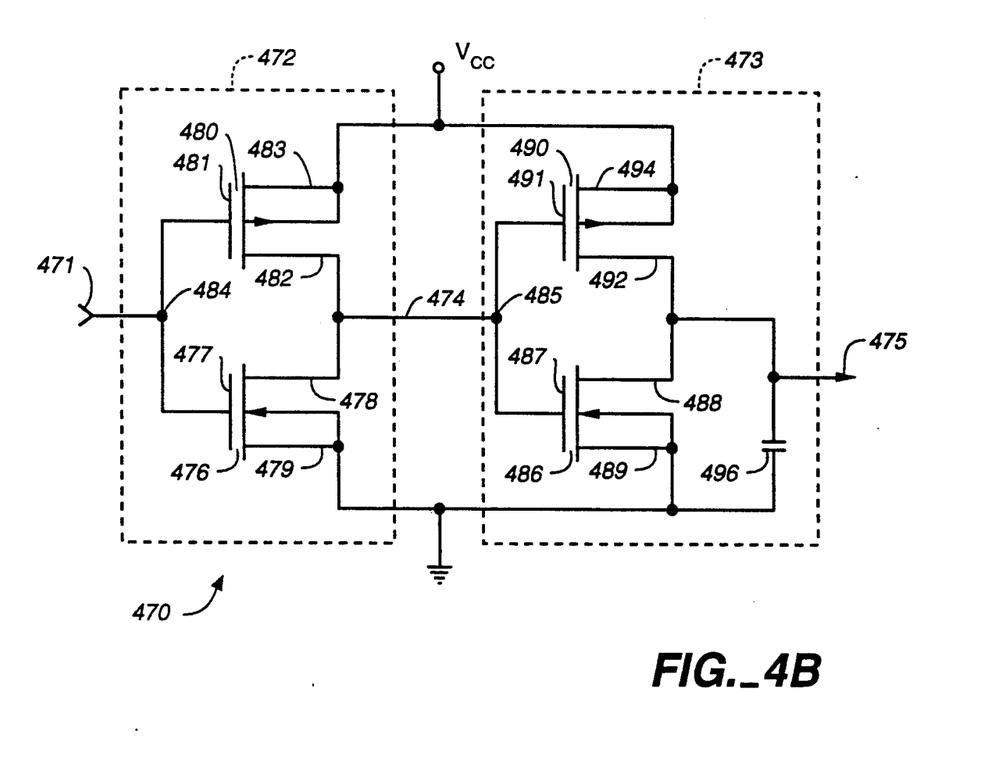
FIG. 4(b) is a schematic diagram of another embodiment of a control signal generator according to the present invention.

Referring more specifically to the embodiments shown in FIGS. 4(a) and 4(b), FIG. 4(a) shows an implementation of a control signal generator 450 using a current source 469 and a transistor 460 configured as an emitter follower. Control signal generator 450 can be used to replace control signal generator 430, shown in FIG. 3.

Control signal generator 450 comprises an input port 452 and an output port 454 for outputting a control signal. Ports 452 and 454 correspond to node 404 and port 436, respectively, shown in FIG. 3. Input port 452 is coupled to the base 461 of transistor 460. The collector 462 of transistor 460 is connected to a voltage Vcc. The emitter 463 of transistor 460 is connected to output port 454, current source 469, and a storage capacitor 458. The other ends of capacitor 458 and current source 469 are connected to ground.

FIG. 4(b) shows an implementation of a control signal generator 470 suitable for implementation within an integrated circuit using CMOS technology. Control signal generator 470 can be used to replace control signal generator 340, shown in FIG. 2. Control signal generator 470 comprises an input port 471, a first stage 472, a second stage 473, a signal line 474 connecting first stage 472 to second stage 473, and an output port 475 for outputting a control signal. Ports 471 and 474 correspond to node 328 and port 344, respectively, shown in FIG. 2.

First stage 472 comprises a standard CMOS invertor stage including an NMOS transistor 476 and a PMOS transistor 480. The gate 477 and the drain 478 of NMOS transistor 476 are connected to the gate 481 and drain 482, respectively, of PMOS transistor 480. The source 479 of NMOS transistor 476 is connected to ground while the source 483 of PMOS transistor 480 is connected to a voltage Vcc. The gates 477 and 481 of transistors 476 and 480, respectively, are coupled to a node 484 which is in turn coupled to input port 471. The drains 478 and 482 of transistors 476 and 480, respectively, are coupled to one end of signal line 474.

The other end of signal line 474 is coupled to an input node 485 inside second stage 473. Second stage 473 comprises an NMOS transistor 486, a PMOS transistor 490, and a capacitor 496. Node 485 is coupled to the gates 487 and 491 of NMOS transistor 486 and PMOS transistor 490, respectively. The drains 488 and 492 of NMOS transistor 486 and PMOS transistor 490, respectively, are connected together and are also connected to output port 475 and one end of capacitor 496. The other end of capacitor 496 is connected to ground. The source 489 of NMOS transistor 486 is coupled to ground while the source 494 of PMOS transistor 490 is coupled to voltage Vcc. PMOS transistor 490 functions as a load in second stage 473. Although the transistors in second stage 473 are connected in a similar manner to the transistors in first stage 472, the resistance of the transistors in their respective "on" states is different. More specifically, transistors 486 and 490 in second stage 473 are designed to have predetermined resistance values in their respective "on" states in order to control the charging and discharging rates of capacitor 496, as explained below. On the other hand, transistors 476 and 480 in first stage 472 are designed to have a low "on" state resistance.

In operation of control signal generator 470, since input port 471 is coupled to node 328 of FIG. 2, input port 471 is held in a "high" state in the absence of a second external clock signal. Consequently, node 484 of first stage 472 is held in a "high" state. Since first stage 472 is configured as an invertor, the signal at signal line 474 is held in a "low" state in response thereto. This causes PMOS transistor 490 inside second stage 473 to remain in its conducting state, which charges capacitor 496 to a voltage close to Vcc. NMOS transistor 486 is kept off by the "low" state of signal line 474. As explained below, the physical dimensions of PMOS transistor 490 are scaled such that the charging of capacitor 496 from a "low" state to a "high" state will take longer than a single clock period of predetermined length. Thus, when the second external clock signal is absence for more than the time it takes to change the state of capacitor 496 from a "low" to a "high" state, the output port 475 is then in a "high" state.

The state at output port 475 after a second external clock signal is coupled to input port 471 is now described. When the second external clock signal is in a "low" state, the signal at node 484 of first stage 472 also has a "low" state. Since first stage 472 is an invertor stage, the signal at signal line 474 has a "high" state, which turns on NMOS transistor 486. Consequently, capacitor 496 is enabled to discharge through NMOS transistor 486. The dimension of NMOS transistor 486 is scaled such that the time required for transistor 486 to substantially fully discharge capacitor 496 is less than half a clock period of the second external clock signal. Consequently, capacitor 496 can be substantially fully discharged within the first cycle after the second external clock signal is coupled to input port 471. Once capacitor 496 is substantially fully discharged, the state of output port 475 is in a "low" state.

During the next half cycle of the second external clock signal, the external clock signal is in a "high" state. Due to the inversion action of first stage 472, signal line 474 is now in a "low" state. As a result, PMOS transistor 490 is turned on while NMOS transistor 486 is turned off. Consequently, capacitor 496 is charged by PMOS transistor 490. As mentioned above, the physical dimensions of PMOS transistor 490 are scaled such that the charging of capacitor 496 from a "low" state to a "high" state will take longer than a single clock period. Thus, even though the voltage across capacitor 496 increases during this next half cycle, capacitor 496 will remain in essentially a "low" state during this time. Consequently, output port 475 also remains in a "low" state.

During the first half of the next cycle, the second external clock signal is again in a "low" state. As pointed out above, capacitor 496 discharges when the second external clock signal is in a "low" state. As a result, the charge that had accumulated in capacitor 496 as a result of charging by PMOS transistor 490 is now discharged. The relative scaling of the NMOS transistor 486 and PMOS 490 is such that capacitor 496 and output port 475 stay in the "low" state throughout subsequent clock cycles as long as the second external clock signal is coupled to input port 471.

Upon removal of the second external clock signal, the input port 471 is held in a "high" state because port 471 is connected to node 328 of FIG. 2. As explained above, NMOS transistor 486 goes off and PMOS transistor 490 returns to a conducting state, which again charges capacitor 496 to a voltage close to Vcc. This voltage across capacitor 496 will cause output port 475 to thus return to a "high" state after a predetermined amount of time upon the removal of the second external clock signal.

The use of scaling of the PMOS transistor 490 and NMOS transistor 486 for the purposes described above is well known. In order to produce a ratio of conductances between the PMOS transistor 490 and NMOS transistor 486, either one or both transistors are preferably made large by increasing the width on the NMOS channel or by increasing the length of the PMOS channel. However, the size of the transistors should be balanced by two other considerations. First, it is desirable that devices fabricated on a silicon substrate occupy a minimum area so that the use of the silicon area can be optimized. Second, the effective loading of the second stage 473 on the first stage 472 increases as the dimensions of transistors 486 and 490 increase. Since it is desirable to reduce the effective loading of the second stage 473, it is desirable to reduce the dimensions of transistors 486 and 490.

If the loading of the second stage 473 on the first stage 472 is significant, the size of the transistors in first stage 472 may best be scaled for optimizing speed. Such scaling would reduce the delay in driving transistors 486 and 490, but at the expense of increasing the loading and delay that first stage 472 imposes on the input circuit that drives first stage 472. Note that even with this increased loading, the loading caused by control signal generator 470 is significantly smaller than the loading caused by the original control signal generator 340 used in FIG. 2. The main component of the loading by the original control signal generator 340 is due to capacitor 332, shown in FIG. 2. Capacitor 332 in FIG. 2 serves the same function as capacitor 496 of FIG. 4(b). Since capacitor 496 is buffered by second stage 473, the loading due to first stage 472 is typically a fraction of the loading of capacitor 496 or, as shown in FIG. 3, capacitor 434.

Figure 5:
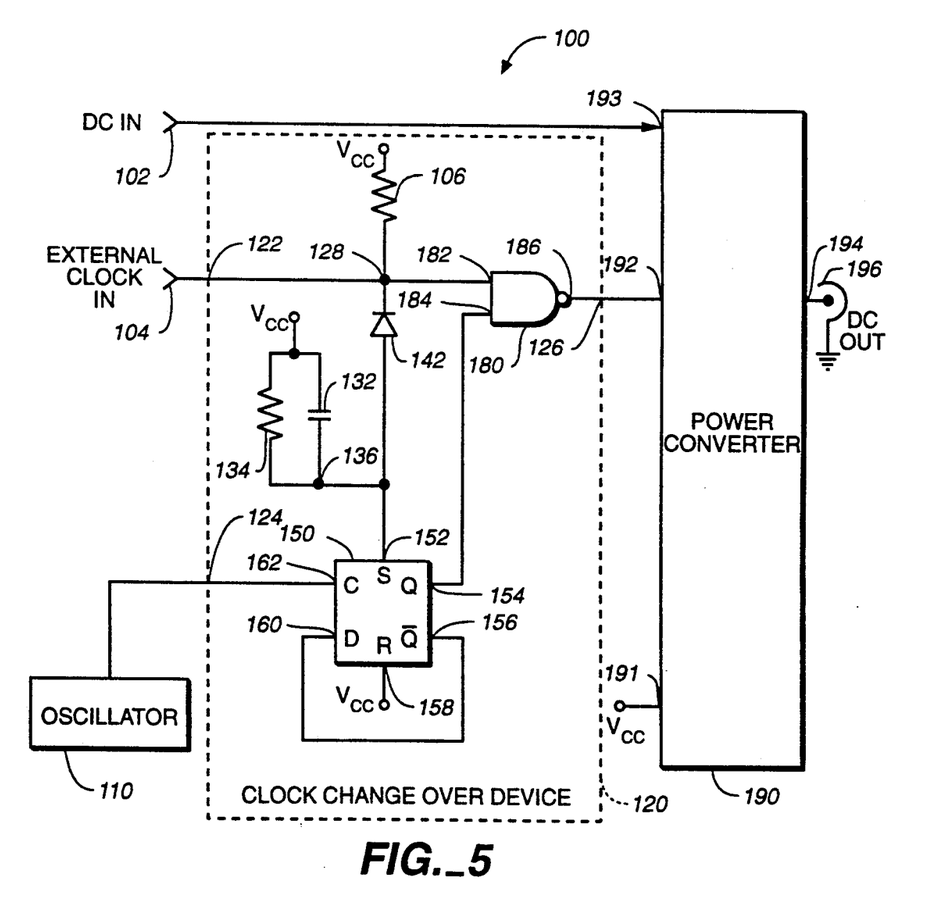
FIG. 5 is a schematic diagram of a switching power supply utilizing a clock changeover device according to the present invention.

An exemplary application of the clock changeover device according to the present invention is in the power supply art. FIG. 5 is a schematic diagram of a switch mode power supply 100 utilizing a clock changeover device according to the present invention. Power supply 100 comprises an internal oscillator 110, a clock changeover device 120, a power converter 190, an input port 104, a DC input voltage port 102, and a DC output voltage port 196. The DC input voltage on input port 102 is coupled to port 193 of converter 190. Input port 104 allows an external clock signal, if present, to be coupled to converter 190 of power supply 100. The DC output voltage, typically a regulated DC voltage produced by converter 190 from the DC input voltage, is coupled via port 194 and output port 196 to an external load (not shown).

Clock changeover device 120 comprises two input ports 122, 124 for coupling two clock signals into the device. Oscillator 110 generates a first clock signal which is coupled to input port 124 of clock changeover device 120. Input port 124 corresponds to input port 214 of FIG. 1, and the clock signal generated by oscillator 110 corresponds to the first external clock signal coupled to input port 214 of FIG. 1. Input port 122 is for the coupling of the external clock signal, if present, into clock changeover device 120. Input port 122 corresponds to input port 212 of FIG. 1, and the external clock signal coupled to port 122 corresponds to the second external clock signal coupled to port 212 of FIG. 1. If there is no external clock signal at port 122, the first clock signal generated by oscillator 110 is coupled to an output port 126 of clock changeover device 120. However, when an external clock signal is coupled to port 122, clock changeover device 120 couples the external clock signal to output port 126 and the first clock signal is suppressed.

Power converter 190 comprises circuits typically found in a switch-mode power supply. Converter 190 requires the above described clock signal for generating a pulse-width modulated signal which controls the duty cycle of the power supply. This clock signal is supplied by clock changeover device 120, and is coupled to input port 192 of converter 190.

The clock signal supplied to converter 190 is preferably a 50% duty cycle square wave signal. However, a typical prior art low cost oscillator does not have a 50% duty cycle. As a result, a flip-flop is typically coupled to the output of the oscillator to generate the desired 50% duty cycle square wave signal for inputting to converter 190. As is discussed below, clock changeover device 120 also uses a flip-flop to generate a 50% duty cycle square wave signal. However, by appropriate arrangement of this flip-flop in clock changeover device 120, this flip-flop is also used as a NAND gate, thereby eliminating from device 120 the need for a NAND gate corresponding to NAND gate 350 of FIG. 2.

Clock changeover device 120 comprises a resistor 106, a diode 142, an RC circuit comprising a parallel combination of a resistor 134 and a capacitor 132, a NAND gate 180 and a D-type flip-flop 150. Both flip-flop 150 and NAND gate 180 are digital devices powered by a voltage source with potential Vcc. In a preferred embodiment of the present invention, voltage source Vcc is generated by converter 190 in a conventional manner and is output at a port 191 for use by clock changeover device 120. The value of Vcc is determined by the type of digital devices used. If TTL digital devices are used, Vcc is substantially equal to 5 volt. The signals of these digital devices can either be in a logic "high" state, typically near Vcc, or in a logic "low" state, typically near ground potential. In FIG. 5, a TTL digital device 74132 is used for NAND gate 180 and a TTL digital device 7474 is used for flip-flop 150. It may be understood that other digital devices, TTL or otherwise, can be used for NAND gate 180 and flip-flop 150.

The flip-flop 150 used in FIG. 5 has an input clock terminal 162, an input data terminal 160, an input set terminal 152, an input clear terminal 158, an non-inverting output terminal 154 and an inverting output terminal 156. Input clock terminal 162 is coupled to port 124 of clock changeover device 120 which in turn is coupled to oscillator 110. Inverting output terminal 156 is coupled to input data terminal 160. Output terminal 154 is coupled to an input terminal 184 of NAND gate 180. Input clear terminal 158 is held high so that flip-flop 150 is enabled to provide normal operation. For the 7474 device, input clear terminal 158 should be coupled to Vcc.

The mode of operation of flip-flop 150 is determined by the state of a control signal coupled to input set terminal 152. For the 7474 device, when input set terminal 152 is at a logic "low" state, i.e., near ground potential, output terminal 154 is at a logic "high" state, i.e., near Vcc, regardless of the states of input data terminal 160 and input clock terminal 162. However, when the control signal coupled to input set terminal 152 is at a "high" state, flip-flop 150 is enabled to operate as a normal D-type flip-flop, i.e., the logic state at output terminal 154 follows the logic state at the input data terminal 160 each time the clock signal at input clock terminal 162 makes a transition from a logic high state to a logic low state.

When flip-flop 150 is in its normal D-type flip-flop operation, it is well known in the art that the direct coupling of inverting output terminal 156 and input data terminal 160, as shown in FIG. 5, results in output terminal 154 toggling between a "high" and a "low" state as the clock signal coupled to input clock terminal 162 goes through a complete clock cycle of a "high" level and a "low" level. As a result, flip-flop 150 in this circuit arrangement generates a square wave signal from the first clock signal generated by oscillator 110 so long as flip-flop 150 is enabled, irrespective of the duty cycle of the first clock signal. Since input clock terminal 162 is coupled to oscillator 110, the frequency of the clock signal at output terminal 154 is one-half of the frequency of the clock signal generated by oscillator 110 due to the operation of flip-flop 150. This therefore also comprises a means for modifying the frequency of the clock signal. It should be clear to a person of ordinary skill in the art that a T-type flip-flop can be used to achieve the same function provided by flip-flop 150.

A node 128 is coupled to input port 122 of clock changeover device 120, an input terminal 182 of NAND gate 180, the cathode of diode 142, and resistor 106. The other end of resistor 106 is coupled to Vcc. The anode of diode 142 is coupled to node 136 of RC circuit 132, 134 and the input set terminal 152 of flip-flop 150. The other end of RC circuit 132, 134 is coupled to Vcc.

The operation of clock changeover device 120 when there is no external clock signal at input port 122 is now described. The logic state at node 128 is "high" because the voltage at node 128 is pulled up by resistor 106 to a value substantially equal to Vcc. Since node 128 is coupled to input terminal 182 of NAND gate 180, the logic state at input terminal 182 is also "high". Consequently, the signal at the other input to NAND gate 180, at input terminal 184, controls the logic state of output terminal 186 of NAND gate 180, i.e. it is just the complement of the logic state of the signal appearing at input terminal 184.

Node 128 is also coupled to the cathode of diode 142. Since the voltage at node 142 is substantially equal to Vcc, diode 142 is not conducting. As a result, the input set terminal 152 of flip-flop 150 and node 136 are at a logic "high" state because they are coupled to Vcc through resistor 134. This is the means for generating a control signal having a logic "high" state when there is no external clock signal at input port 122. As was discussed above, with the set terminal 152 in a logic "high" state, flip-flop 150 is enabled to operate as a square wave generator for the first clock signal. Note that the signal at output terminal 154 is a clock signal whose frequency is equal to one-half that of the clock signal generated by oscillator 110.

Output terminal 154 of flip-flop 150 is coupled to input terminal 184 of NAND gate 180. As was discussed before, the signal at output terminal 186 of NAND gate 180 is the complement of the signal at input terminal 184 when node 128 is in a logic "high" state. As a result, the signal at output terminal 186 is also a clock signal with frequency equal to one-half that of the first clock signal generated by oscillator 110. This clock signal is coupled out of clock changeover device 120 at port 126.

The operation of clock changeover device 120 when an external clock signal is present at input port 122 is now described. As was discussed above, when the logic state of input set terminal 152 is "low", the state of output terminal 154 of flip-flop 150, and consequently the state of input terminal 184 of NAND gate 180, becomes "high", regardless of the state at input clock terminal 162. As a result, the signal at output terminal 186 of NAND gate 180 follows the signal at input terminal 182, i.e., the external clock signal. The external clock signal is thus coupled out of clock changeover device 120 at output port 126 in this mode. As is explained below, the logic state of input set terminal 152 of flip-flop 150 changes to a logic "low" state in less than one cycle of the external clock signal. Thus, the changeover is completed within one cycle after the external clock signal is coupled to second input port 122 and is accomplished without the use of any other external control signal.

The state of the control signal at input set terminal 152, which is the same as the state of node 136, is now described. As was discussed above, before the external clock signal is coupled to second input port 122 of clock changeover device 120, the logic states at node 136 and input set terminal 152 are "high". When the external clock signal first goes to a logic "low" level, diode 142 becomes conductive because the voltage at node 136 is now higher than the voltage at node 128 at this point. This conductive path causes capacitor 132 to charge up. In other words, energy is stored in capacitor 132, with the result that a potential difference is created across the plates of capacitor 132. Eventually, the voltage at node 136 and input set terminal 152 decreases to a value corresponding to a logic "low" state. The value of capacitor 132 is chosen such that the voltage at node 136 and input set terminal 152 drops to a logic "low" level before the external clock signal completes its logic "low" level period. As was explained above, once input set terminal 152 is at a logic "low" state, the signal at output terminal 186 of NAND gate 180 is the complement of the external clock signal because input terminal 184 is held at a logic "high" state by the operation of flip-flop 150. As a result, the output of clock changeover device 120 switches to the external clock signal within one clock "low" level period. Capacitor 132, diode 142, and their interconnection to nodes 128 and 136 comprise means for generating a control signal having a "low" state when the external clock signal is coupled to clock changeover device 120.

When the external clock signal goes from a "low" level to a "high" level, diode 142 is again nonconductive because diode 142 is now reverse biased. Thus, the conduction path from RC circuit 132, 134 to node 128 is cut off. Capacitor 132 now begins to discharge by a current through resistor 134. As a result, the voltage at node 136 begins to rise. The time it takes to raise the voltage at node 136 to a logic "high" state from discharging by resistor 134 is designed to be longer than the time interval of the logic "high" level period of the external clock signal. Consequently, the state of input set terminal 152 does not reach a "high" logic level within this "high" period of the external clock signal. As a result, flip-flop 150 remains disabled, and thus continues to couple a logic high signal to NAND gate 180, and the external clock signal thereby remains coupled to output port 126 of clock changeover device 120.

Finally, the operation of clock changeover device 120 when the external clock signal is removed from input port 122 of clock changeover device 120 is discussed. Once the external clock signal is removed, the potential at node 128 is at a "high" level because node 128 is coupled to Vcc through resistor 106. As a result, diode 142 is now nonconductive. Capacitor 132 is discharged by a current from resistor 134, such that the voltage at node 136 and input set terminal 152 rise from a "low" logic level and, after some transition time, eventually to a "high" logic level. Once the state of input set terminal 152 becomes "high", the clock signal from oscillator 110 is divided by two and coupled to output port 126 of clock changeover device 120. Thus, the signal at output port 126 is switched from the external clock signal back to the internal clock signal. Capacitor 132, resistor 134 and their interconnection to Vcc and to node 136 comprise means for generating a control signal having a "high" state when the external diode signal is decoupled from port 104.

In order to reduce the transition period of switching from external clock signal to internal clock signal, it is desirable to have the time constant of RC circuit 132, 134 be chosen such that the transition time is slightly longer than one "high" period of the external clock signal. In this way, clock changeover device 120 does not switch to the internal clock signal when the external clock signal is present while the transition time from the external clock signal to the internal clock signal is minimal after the external clock signal is removed.

Figure 6:
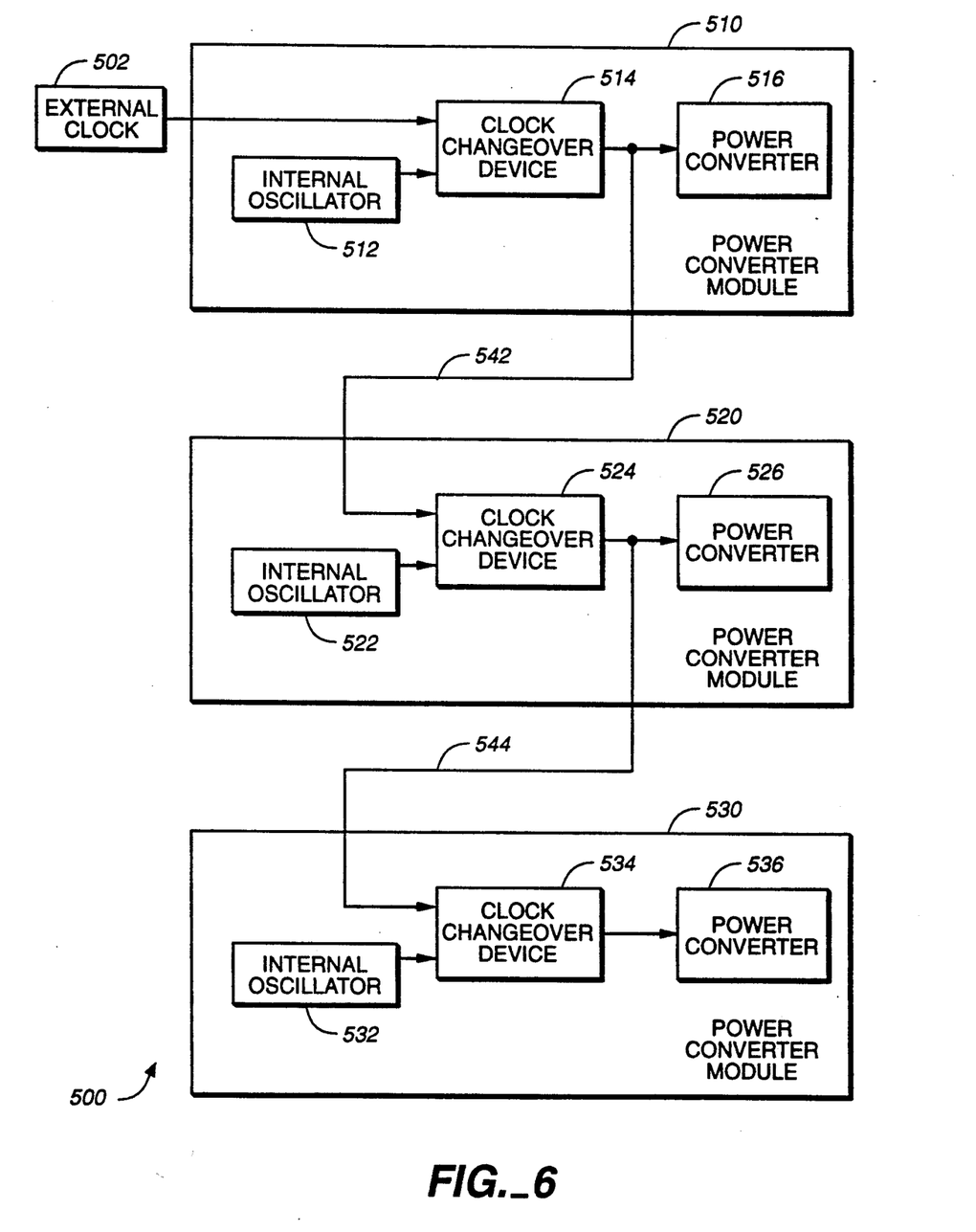
FIG. 6 is a block diagram of a daisy-chained power supply system according to the present invention.

FIG. 6 is a drawing showing a power supply system 500 using a plurality of power converter modules 510, 520, and 530 connected together in a daisy chain manner such that they are driven by the same external clock signal generator 502. In FIG. 6, only three power converter modules are shown. However, there is no limitation as to the number of power supply modules that can be connected.

Each power converter module has the same configuration and functions in a similar manner as power supply 100, shown in FIG. 5. Thus, power converter module 510, 520, and 530 have internal oscillators 512, 522, and 532, respectively, coupled to clock changeover devices 514, 524, and 534, respectively. The outputs of clock changeover devices 514, 524, and 534 are coupled to power converters 516, 526, and 536, respectively.

Clock changeover device 514 also accepts external clock signal generator 502 as input. The output of clock changeover device 514 is coupled to clock changeover device 524 of power converter module 520 in daisy chain fashion through line 542. Similarly, the output of clock changeover device 524 is coupled to clock changeover device 534 of power converter module 530 through line 544.

When external clock signal generator 502 is connected to power converter module 510, all the power converter modules are controlled by the signal generated by external clock signal generator 502. Such a synchronized power supply system has the advantage that the noise generated by the power supply system is reduced compared to the case where all the power converter modules are controlled by their own clocks having slightly different frequencies. This is because if all the power converters are controlled by their own clocks, each one having slightly different frequencies, the signals from each pair of clocks would beat at a certain frequency thereby generating noise having a plurality of frequencies one or more of which could be in an audible range.

Another advantage of the daisy chain arrangement, shown in FIG. 6, is that if the daisy chain breaks, say at line 542, the power converters below the break in the daisy chain, power converters 520 and 530 in this instance, will be controlled by internal oscillator 522 because the signal at line 544 is the signal generated by internal oscillator 522. Thus, the rest of the chain remains in synchronization. As a result, the amount of noise is still less than the case where all the power converters are controlled by their own clocks in an asynchronous fashion.

Various modifications of the invention, in addition to those shown and described herein, will be apparent to those skilled in the art from the foregoing description and accompanying drawings. Such modifications are intended to fall within the scope of the appended claims.

What is claimed is:

1. A clock changeover device comprising:
   a first input port to which a first external clock signal is coupled;
   a second input port to which a second external clock signal is selectively coupled, said second external clock signal alternating at a predetermined rate between a first and a second signal voltage level, such that in each clock cycle, said second external clock signal remains at each said signal voltage level for a predetermined period of time;
   an output port for outputting a clock signal;
   control means connected to said second input port for generating a control signal having a first state and a second state, said control signal being in said second state after said second external clock signal has been coupled to said second input port for at least a predetermined period of time, said control signal being in said first state when said second external clock signal is not coupled to said second input port; and output means responsive to said control signal for coupling said first input port to said output port when said control signal is in said first state and for coupling said second input port to said output port when said control signal is in said second state;

wherein said control means comprises energy storage means having a first and a second energy state corresponding to a first and a second energy state voltage level, the state of said control signal being in said first state when said energy storage means is at said first energy state voltage level and in said second state when said energy storage means is at said second energy state voltage level; and changing means for changing the voltage level of said energy storage means from said first energy state voltage level to said second energy state voltage level within a first time interval when said second external clock signal is at said first signal voltage level after said second external clock signal is first coupled to said second input port, and for changing the voltage level of said energy storage means from said second energy state voltage level to said first energy state voltage level when said second external clock signal is at said second signal voltage level or when said second external clock signal is not coupled to said second input port, the time for changing from said second energy state voltage level to said first energy state voltage level being longer than the length of time in which said second external clock signal is at said second signal voltage level in a given clock cycle.

2. The clock changeover device of claim 1 wherein said energy storage means comprises a capacitor having a first end for outputting said control signal and a second end for connecting to a predetermined potential.

3. The clock changeover device of claim 2, wherein said changing means comprises:
   a diode having a cathode coupled to said second input port and an anode coupled to said first end of said capacitor; and
   a resistor having a first end coupled to said first end of said capacitor and a second end coupled to a potential substantially the same as said second signal voltage level.

4. The clock changeover device of claim 3 wherein said output means comprises:
   a first NAND gate having a first input terminal, a second input terminal coupled to said second input port, and an output terminal coupled to said output port; and
   a second NAND gate having a first input terminal for inputting said control signal, a second input terminal coupled to said first input port, and an output terminal coupled to said first input terminal of said first NAND gate.

5. The clock changeover device of claim 3 wherein said output means comprises:
   a NAND gate having a first input terminal, a second input terminal coupled to said second input port, and an output terminal coupled to said output port; and
   a D-type flip-flop having a clock terminal, a set terminal, a data terminal, a non-inverting output terminal, and an inverting output terminal, said data terminal being coupled to said inverting output terminal, said set terminal being coupled to said control signal, said clock terminal being coupled to said first input port, said non-inverting output terminal being coupled to said first input terminal of said NAND gate.

6. The clock changeover device of claim 4 wherein said changing means comprises:
   a diode having an anode coupled to said second input port and a cathode coupled to said first end of said capacitor; and
   a resistor having a first end coupled to said first end of said capacitor and a second end coupled to a potential substantially the same as said second signal voltage level.

7. The clock changeover device of claim 6 wherein said output means comprises:
   a first NOR gate having a first input terminal, a second input terminal coupled to said second input port, and an output terminal coupled to said output port; and
   a second NOR gate having a first input terminal for inputting said control signal, a second input terminal coupled to said first input port, and an output terminal coupled to said first input terminal of said first NOR gate.

8. The clock changeover device of claim 2 wherein said changing means comprises:
   a transistor having a base coupled to said second input port, an emitter coupled to said first end of said capacitor, and a collector coupled to a potential substantially the same as said first signal voltage level; and
   a current source having one end coupled to said first end of said capacitor and a second end coupled to a potential substantially the same as said second signal voltage level.

9. The clock changeover device of claim 2 wherein said changing means comprises a CMOS device having a predetermined ratio of N-channel ON resistance and P-channel ON resistance for providing a rate of charging for said capacitor different from a rate of discharge for said capacitor, said CMOS device changing the voltage level of said first end of said capacitor from said first energy state voltage level to said second energy state voltage level within a first time interval when said second external clock signal is at said first signal voltage level after said second external clock signal is first coupled to said second input port, said CMOS device changing the voltage level of said first end of said capacitor from said second energy state voltage level to said first energy state voltage level when said second external clock signal is at said second signal voltage level or when said second external clock signal is not coupled to said second input port, the time for changing from said second energy state voltage level to said first energy state voltage level being longer than the length of time in which said second external clock signal is at said second signal voltage level in a given clock cycle.

10. The clock changeover device of claim 9 wherein said CMOS device comprises:
    a first CMOS stage having an input terminal and an output terminal, said input terminal of said first CMOS stage being coupled to said second input port, said output terminal of said first CMOS stage generating a signal which is the inverse of a signal coupled to said input terminal of said first CMOS stage; and
    a second CMOS stage comprising:

a PMOS transistor having a gate, a drain, and a source, said source of said PMOS transistor being coupled to a potential substantially the same as said second signal voltage level, said gate of said PMOS transistor being coupled to said output terminal of said first CMOS stage, and said drain being coupled to said first end of said capacitor, said PMOS transistor having a predetermined "on" resistance such that the time for changing the voltage of said first end of said capacitor from said second energy state voltage level to said first energy state voltage level being longer than the length of time in which said second external clock signal is at said second signal voltage level in a given clock cycle, and an NMOS transistor having a gate, a drain and a source, said gate and said drain of said NMOS transistor being coupled to said gate and said drain of said PMOS transistor, respectively, said source of said NMOS transistor being coupled to a potential substantially the same as said first signal voltage level, said NMOS transistor having a predetermined "on" resistance such that the time for changing the voltage level of said first end of said capacitor from said first energy state voltage level to said second energy state voltage level being within a first time interval when said second external clock signal is at said first signal voltage level.

11. A clock changeover device having an output port coupled to a power converter for supplying said power converter with a clock signal, a first input port coupled to an oscillator, and a second input port to which an external clock signal is selectively coupled, said external clock signal alternating at a predetermined rate between a high and a low voltage level, such that in each clock cycle, said second external clock signal remains at each said level for a predetermined period of time, said high voltage level being substantially the same as the voltage corresponding to a logic "high" state and said low voltage level being substantially the same as the voltage corresponding to a logic "low" state, said clock changeover device comprises:

control means connected to said second input port for generating a control signal having a first state and a second state, said control signal being in said second state after said external clock signal has been coupled to said second input port for at least a predetermined period of time, said control signal being in said first state when said external clock signal is not coupled to said second input port; and output means responsive to said control signal for coupling said oscillator to said output port when said control signal is in said first state and for coupling said external clock signal to said output port when said control signal is in said second state;

wherein said control means comprises a capacitor having a first end for outputting said control signal and a second end coupled to a potential substantially the same as said high voltage level;

a rectifier for changing the voltage of said first end of said capacitor to said low voltage level when said external clock signal is coupled to said second input port and is in said low voltage level, said rectifier having a first end coupled to said second input port and a second end coupled to the first end of said capacitor, said rectifier changing the voltage of said capacitor such that the voltage at the first end of said capacitor drops substantially to said low voltage level within the first complete clock cycle after said external clock signal is coupled to said second input port; and a resistor for changing the voltage of said first end of said capacitor to said high voltage level, said resistor having a first end coupled to said first end of said capacitor and a second end coupled to said second end of said capacitor, the resistance of said resistor being chosen such that the time required for changing said first end of said capacitor to said high voltage level is longer than the time said external clock signal stays at said high voltage level.

12. A clock changeover device according to claim 11 wherein said output means comprises:

a NAND gate having a first input terminal, a second input terminal coupled to said second input port, and an output terminal coupled to said power converter; and a D-type flip-flop having a clock terminal, a set terminal, a data terminal, a non-inverting output terminal, and an inverting output terminal, said data terminal being coupled to said inverting output terminal, said set terminal being coupled to said control signal, said clock terminal being coupled to said oscillator, said non-inverting output terminal being coupled to said first input terminal of said NAND gate.

13. A clock changeover device having an output port coupled to a power converter for supplying said power converter with a clock signal, a first input port coupled to an oscillator, and a second input port to which an external clock signal is selectively coupled, said external clock signal alternating at a predetermined rate between a high and a low voltage level, such that in each clock cycle, said second external clock signal remains at each said level for a predetermined period of time, said high voltage level being substantially the same as the voltage corresponding to a logic "high" state and said low voltage level being substantially the same as the voltage corresponding to a logic "low" state, said clock changeover device comprises:

control means connected to said second input port for generating a control signal having a first state and a second state, said control signal being in said second state after said external clock signal has been coupled to said second input port for at least a predetermined period of time, said control signal being in said first state when said external clock signal is not coupled to said second input port; and output means responsive to said control signal for coupling said oscillator to said output port when said control signal is in said first state and for coupling said external clock signal to said output port when said control signal is in said second state;

wherein said control means comprises a capacitor having a first end for outputting said control signal and a second end coupled to a potential substantially the same as said low voltage level;

a rectifier for changing the voltage of said first end of said capacitor to said high voltage level when said external clock signal is coupled to said second input port and is in said high voltage level, said rectifier having a first end coupled to said second input port and a second end coupled to said first end of said capacitor, said rectifier changing the voltage of said capacitor such that the voltage at said first end of said capacitor rises substantially to said high voltage level within the first complete clock cycle after said external clock signal is coupled to said second input port; and a resistor for changing the voltage of said first end of said capacitor to said low voltage level, said resistor having a first end coupled to said first end of said capacitor and a second end coupled to said second end of said capacitor, the resistance of said resistor being chosen such that the time required for changing said first end of said capacitor to said low voltage level is longer than the time said external clock signal stays at said low voltage level.

* * * * *